US009304014B2

(12) United States Patent
Komati et al.

(10) Patent No.: US 9,304,014 B2
(45) Date of Patent: Apr. 5, 2016

(54) SYSTEMS AND METHODS FOR TEMPERATURE COMPENSATION IN A UTILITY METER

(71) Applicant: General Electric Company, Schnectady, NY (US)

(72) Inventors: Sanjiv C. Komati, Andhra Pradesh (IN); Harish Sarma Krishnamoorthy, Bryan, TX (US)

(73) Assignee: General Electric Company, Schenectady, NY (US)

( * ) Notice: Subject to any disclaimer, the term of this patent is extended or adjusted under 35 U.S.C. 154(b) by 634 days.

(21) Appl. No.: 13/647,065

(22) Filed: Oct. 8, 2012

(65) Prior Publication Data

US 2014/0100808 A1    Apr. 10, 2014

(51) Int. Cl.
G01D 18/00 (2006.01)
G01D 4/00 (2006.01)
G01D 3/036 (2006.01)

(52) U.S. Cl.
CPC ............... *G01D 4/00* (2013.01); *G01D 3/0365* (2013.01)

(58) Field of Classification Search
CPC .................................. G01K 1/00; G06F 19/00
See application file for complete search history.

(56) References Cited

U.S. PATENT DOCUMENTS

| 3,961,247 | A * | 6/1976 | Toki ............................. 324/721 |
| 6,559,631 | B1 * | 5/2003 | Balch et al. .................. 324/142 |
| 6,618,684 | B1 * | 9/2003 | Beroset et al. ................. 702/99 |
| 7,541,800 | B2 * | 6/2009 | Lee et al. ...................... 324/127 |
| 2007/0258503 | A1 * | 11/2007 | Clark et al. ....................... 374/1 |
| 2008/0036447 | A1 * | 2/2008 | Slater et al. ................... 324/105 |
| 2008/0082275 | A1 * | 4/2008 | Caggiano et al. ............... 702/61 |
| 2009/0109021 | A1 * | 4/2009 | Paoletti et al. ................ 340/540 |
| 2009/0189541 | A1 * | 7/2009 | Crawford et al. ............. 315/294 |
| 2010/0036624 | A1  | 2/2010 | Martin et al. |
| 2010/0036625 | A1 * | 2/2010 | Martin et al. ................... 702/62 |
| 2010/0145642 | A1 * | 6/2010 | Slota et al. ...................... 702/61 |
| 2010/0319436 | A1 * | 12/2010 | Sun et al. ...................... 73/61.46 |

FOREIGN PATENT DOCUMENTS

| EP | 2 461 311 A2 | 6/2012 |
| GB | 2491970 A | 12/2012 |

OTHER PUBLICATIONS

European search report issued in connection with EP Application No. 13189052.7 dated Mar. 27, 2014.

* cited by examiner

*Primary Examiner* — Elias Desta
(74) *Attorney, Agent, or Firm* — Sutherland Asbill & Brennan LLP

(57) ABSTRACT

Systems and methods for temperature compensation in a utility meter are provided. According to one embodiment of the disclosure, there is disclosed a method. The method can include receiving, from a sensor of a device, a temperature and a current associated with a first portion of the device. The method can also include determining, based at least in part on a correlation between at least one prior measured temperature and current associated with the first portion of the device and a prior measured temperature and current associated with a second portion of the device, a predicted temperature associated with the second portion of the device.

18 Claims, 3 Drawing Sheets ments of the utility meter, or respective temperature sensors associated with each or set of current transformers can increase the product costs for the utility meter.

SYSTEMS AND METHODS FOR TEMPERATURE COMPENSATION IN A UTILITY METER

FIELD OF THE DISCLOSURE

Embodiments of the disclosure relate generally to utility meters, and more particularly, to systems and methods for temperature compensation in a utility meter.

BACKGROUND

Many energy meters, also known generally as utility meters, can have different modules which serve different purposes. For example, a utility meter can have a metering module, a power supply module, relays, current transformers (CTs), etc. In some meters, the modules can be in the same or different compartments within the utility meter.

The accuracy of utility meters can vary with respect to temperature, particularly, in some instances, due to the behavior of current transformers with respect to temperature. In one conventional utility meter, a temperature sensor located near a metering module, such as an on-chip sensor, measures the approximate temperature of a current transformer of interest since the metering module is near the current transformer, or within the same compartment. However, in some instances, a temperature sensor may be located in one compartment of the utility meter, and the current transformer of interest may be located in another compartment of the utility meter, which creates a problem in measuring the actual temperature of the current transformer of interest since the temperature sensor is in a different compartment of the utility meter. In other instances, multiple temperature sensors in different compartments of the utility meter, or respective temperature sensors associated with each or set of current transformers can increase the product costs for the utility meter.

BRIEF SUMMARY

Some or all of the above needs and/or problems may be addressed by certain embodiments of the disclosure. Certain embodiments may include systems and methods for temperature compensation in a utility meter. According to one embodiment of the disclosure, there is disclosed a system. The system can include at least one memory that stores computer-executable instructions. The system can also include at least one processor configured to access the at least one memory. The at least one processor is configured to execute the computer-executable instructions to receive a temperature and a current associated with a first portion of the device. The processor is configured to execute the computer-executable instructions to determine, based at least in part on a correlation between at least one prior measured temperature and current associated with the first portion of the device and a prior measured temperature and current associated with a second portion of the device, a predicted temperature associated with the second portion of the device.

According to another embodiment of the disclosure, there is disclosed a method. The method can include receiving, from a sensor of a device, a temperature and a current associated with a first portion of the device. The method can also include determining, based at least in part on a correlation between at least one prior measured temperature and current associated with the first portion of the device and a prior measured temperature and current associated with a second portion of the device, a predicted temperature associated with the second portion of the device.

Further, according to another embodiment of the disclosure, there is disclosed one or more computer-readable media storing computer-executable instructions that, when executed by at least one processor, configure the at least one processor to perform operations for receiving, from a sensor of an energy meter, a temperature of a first portion of the energy meter. The at least one processor can also perform operations for receiving, from a sensor of the energy meter, a current associated with the first portion of the energy meter. Further, the at least one processor can also perform operations for determining, based at least in part on a correlation of a prior measured temperature and current associated with the first portion and a prior measured temperature and current associated with a second portion of the device, a predicted temperature associated with the second portion of the device.

Other embodiments, systems, methods, apparatus aspects, and features of the disclosure will become apparent to those skilled in the art from the following detailed description, the accompanying drawings, and the appended claims.

BRIEF DESCRIPTION OF THE DRAWINGS

The detailed description is set forth with reference to the accompanying drawings, which are not necessarily drawn to scale. The use of the same reference numbers in different figures indicates similar or identical items.

DETAILED DESCRIPTION

Figure 1:
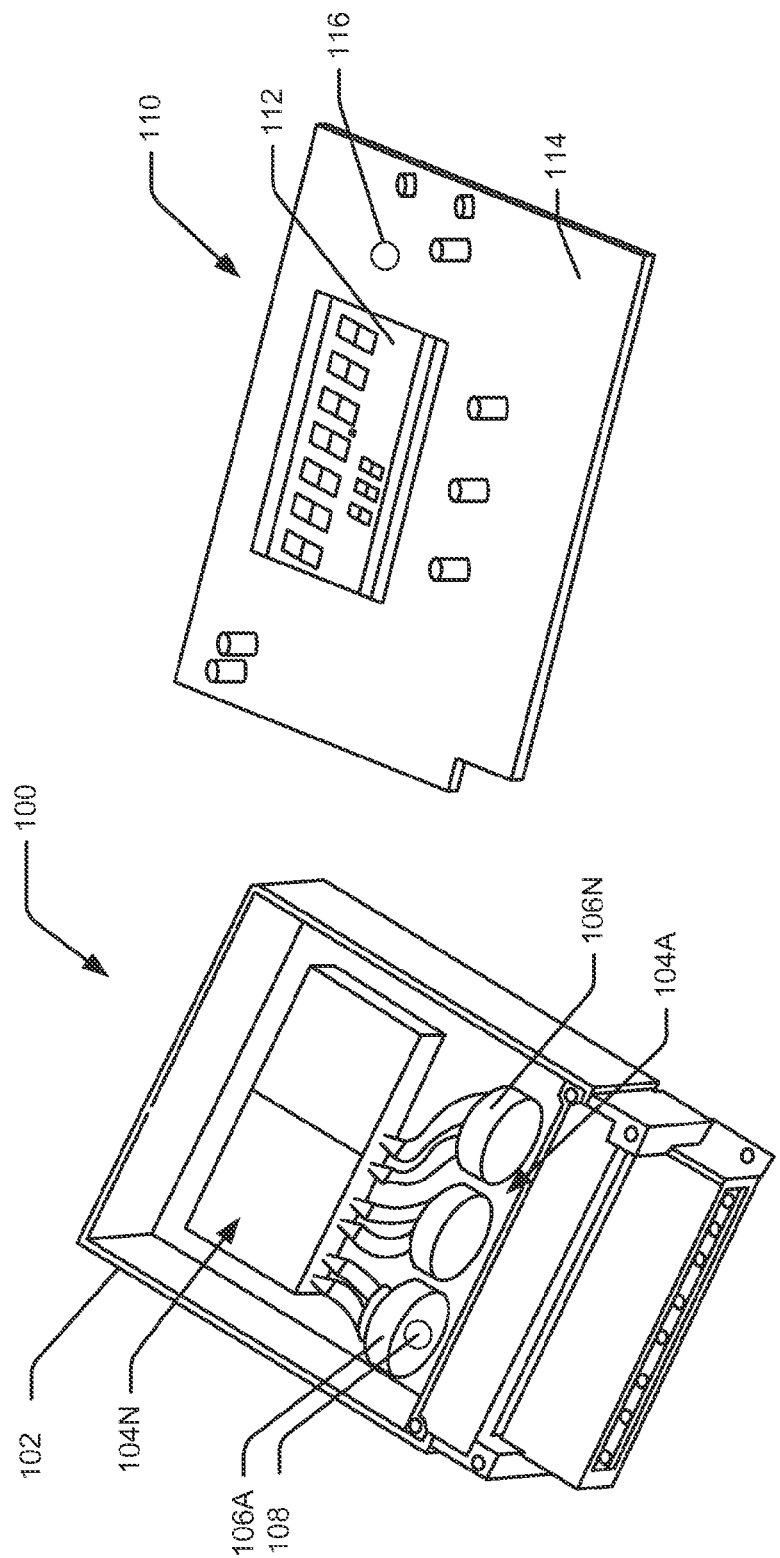
FIG. 1A illustrates an example apparatus or utility meter according to an embodiment of the disclosure.
FIG. 1B illustrates an example component of the apparatus or utility meter shown in FIG. 1A.

Illustrative embodiments of the disclosure will now be described more fully hereinafter with reference to the accompanying drawings, in which some, but not all embodiments of the disclosure are shown. The disclosure may be embodied in many different forms and should not be construed as limited to the embodiments set forth herein; rather, these embodiments are provided so that this disclosure will satisfy applicable legal requirements. As noted above, like numbers refer to like elements throughout.

Illustrative embodiments of the disclosure are directed to, among other things, temperature compensation in a utility meter. As an overview, certain utility meters can include one or more modules, such as a metering module, a power supply module, relays, and current transformers (CTs). In some embodiments, some or all of the modules may be in a respective compartment or portion of the utility meter. Using a correlation between a previously measured temperature associated with a first portion of the utility meter, and another previously measured temperature associated with a second portion of the utility meter, a predicted temperature in the second compartment can be obtained after receiving or measuring a temperature and current in the first compartment. For instance, prior to predicting a temperature in a utility meter, a correlation can be determined between a previously measured temperature associated with a first portion of the utility meter, and another previously measured temperature associated with a second portion of the utility meter. When a predicted temperature for the utility meter is to be determined, a temperature for a first portion of the utility meter can be received or measured. Using the previously determined correlation, a predicted temperature for the second portion of the utility meter can be determined. In this manner, by using a single temperature sensor installed in a utility meter, one or more temperatures can be predicted throughout different portions of a utility meter. The predictions can be determined based on at least one correlation of previously measured temperatures in at least two portions of the utility meter. The predicted temperatures can be used to adjust various outputs associated with the utility meter, such as a data output, thus improving the accuracy of the utility meter. In this manner, one or more adjustments can be implemented to compensate for a drift in the accuracy of the utility meter or apparatus due to a temperature change.

The technical effects of certain embodiments of the disclosure may include improving the accuracy of a utility meter. In particular, the technical effects of certain embodiments of the disclosure may include improving the accuracy of temperature measurements within various portions or compartments of a utility meter. With more accurate temperature measurements, various data outputs from the utility meter can be adjusted accordingly. Further technical effects of certain embodiments of the disclosure may include decreasing the manufacturing costs for a utility meter. In particular, the further technical effects of certain embodiments of the disclosure may include decreasing the number of temperature sensors within a utility meter, thus reducing the number of components needed to manufacture, assemble, and maintain within a utility meter. Moreover, the technical effects of certain embodiments of the disclosure may include improving the accuracy of other measurements within various portions or compartments of a utility meter, such as other measurable physical characteristics, such as pressure, relative humidity, etc. With more accurate measurements of certain physical characteristics, such as pressure, relative humidity, etc., various data outputs from the utility meter can be adjusted accordingly.

FIG. 1A depicts certain illustrative components for a utility meter or apparatus 100 in which techniques for temperature compensation in a utility meter may be implemented. As shown in FIG. 1A, an example apparatus 100 can include a housing 102 with one or more portions or compartments 104A-104N, one or more current transformers (CTs) 106A-106N, and at least one temperature sensor 108 in at least one of the portions or compartments, such as 104A.

Each of the portions or compartments 104A-104N of the housing 102 can include one or more components for the utility meter or apparatus 100. In some embodiments, a divider or wall may segment each portion or compartment 104A-104N from an adjacent portion or compartment 104A-104N. In other embodiments, there may not be any dividers or walls segmenting each portion or compartment 104A-104N from an adjacent portion or compartment 104A-104N. In any instance, differences in temperature between an adjacent portion or compartment 104A-104N may exist due to the operating characteristics of heat dissipating components operating within the various portions or compartments 104A-104N of the housing.

Figure 2:
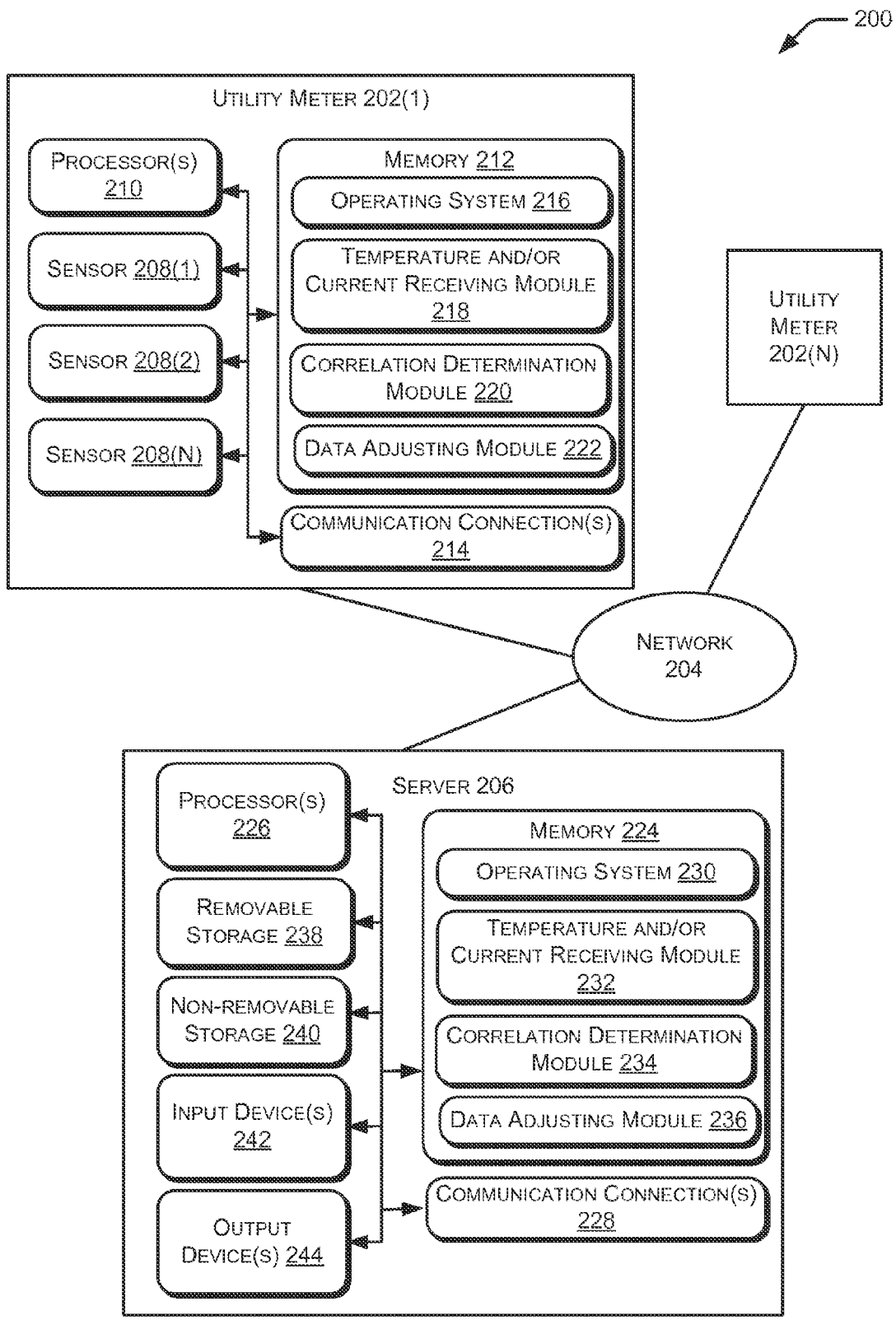
FIG. 2 illustrates an architecture diagram of an example system according to an embodiment of the disclosure.

The example current transformers 106A-106N can provide current flow measurements to a processor or controller, such as shown in FIG. 2, associated with the utility meter or apparatus 100. Likewise, the temperature sensor 108 can provide temperature measurements of a respective current transformer, such as 106A, or of a respective portion or compartment, such as 104A, to a processor or controller, such as shown in FIG. 2, associated with the utility meter or apparatus 100.

In the embodiment shown in FIG. 1A, the temperature sensor 108 is shown mounted to one of the current transformers 106A in a portion or compartment 104A of the housing 102. In other embodiments, the temperature sensor 108 can be mounted to another current transformer, such as 106N; to a different component of the utility meter or apparatus 100, such as a power supply module, relays, metering module, or to another portion or compartment, such as 104N of the housing 102. In any instance, the temperature sensor 108 can sense or otherwise detect a temperature, such as a temperature at a specific time or over a predefined time interval, at a particular location within or on the utility meter or apparatus 100. The example temperature sensor 108 shown in FIG. 1A can be a thermocouple, such as a J-type thermocouple, or any other type of thermocouple or temperature sensing device.

FIG. 1B depicts an illustrative metering module 110 for the utility meter or apparatus 100 shown in FIG. 1A. The metering module 110 can be a chip with an output or display component 112, and a substrate 114 for mounting the output or display component 112. The metering module 110 or chip can be in electrical communication with some or all of the one or more current transformers 106A-106N and the temperature sensor 108 of FIG. 1A.

In the embodiment shown, a temperature sensor 116, similar to 108, can be mounted to the chip or metering module 110, which is mounted within or to the housing 102 of the utility meter or apparatus 100 shown in FIG. 1A. In some instances, there can be an on-chip temperature sensor.

In accordance with certain embodiments of the disclosure, prior to field or commercial operation of a utility meter and associated components, such as shown in FIGS. 1A and 1B, a correlation between temperature and current for one or more portions or compartments of the utility meter may be determined. The correlation may be determined during lab developmental tests, and the correlation can be stored in memory associated with or otherwise accessible by a processor or controller, such as shown in FIG. 2. In one embodiment, multiple temperature measurements can be taken from various components, portions, or compartments of the utility meter during lab developmental tests, in which current flow is also measured through the respective components, portions, or compartments of the utility meter. The various temperature and current flow measurements can be taken over time, such as a predefined time interval. Some or all of the temperatures, current flows, and time measurements can be stored in a memory associated with a processor or controller, such as shown in FIG. 2, or may otherwise be stored in a look-up table, graph, or other device accessible by a processor or controller, such as shown in FIG. 2.

For example, at a given current flow I1 through a utility meter, a first temperature (T1-1) for time t1 can be obtained from a temperature sensor, such as 116 in FIG. 1, mounted to the metering module 110 or chip in a first portion or compartment, such as 104N, of the housing 102. The first current flow measurement (I1) can be obtained by the metering module 110 or, in some instances, a current flow sensor mounted to the metering module 110. A second temperature (T1-2) for time t1 can be obtained from a temperature sensor, similar to 108 in FIG. 1A, mounted to current transformer 106A in a second portion or compartment, such as 104A, of the housing 102. At the same given current flow (I1), the temperatures (T2-1, T2-2) and the current flow measurements (I1) for time t2 can be measured, and again at any number of times t(N). Any number of different temperatures (T) at given current flow measurements (I(N)) for any number of other components, such as current transformers (CTs), at any number of times can be obtained. In any instance, a correlation between the measured temperatures (T) and current flow measurements (I) for any number of times or predefined time intervals can be stored in a memory associated with a processor or controller, such as shown in FIG. 2, or may otherwise be stored in a look-up table, graph, or other device accessible by a processor or controller, such as shown in FIG. 2.

In one embodiment, a predefined time interval can be about 5 minutes. In other embodiments, a predefined time interval can be less than or more than 5 minutes. One will recognize the applicability of embodiments of the disclosure to any predefined time interval.

FIG. 2 illustrates an example environment or system 200 for the utility meter or apparatus 100 of FIG. 1. In FIG. 2, the system 200 can include one or more utility meters 202(1)-202(N), a network 204, and an optional server 206 or host computer. The utility meters 202(1)-202(N) can be similar to the utility meter or apparatus 100 shown in FIG. 1. Each of the utility meters 202(1)-202(N) can communicate via the network 204 with the server 206 or host computer. In some embodiments, some or all of the utility meters 202(1)-202(N) can communicate with each other. One will recognize that various embodiments of the disclosure may include fewer or more system components, and that the embodiment shown in FIG. 2 is by way of example only.

The example system 200 shown illustrates multiple utility meters 202(1)-202(N) in a network configuration with an optional server 206 or host computer, wherein certain embodiments of the disclosure may be implemented by a utility meter, such as 202(1) communicating with the server 206 or host computer. However, in some instances, certain embodiments of the disclosure can be implemented within a single utility meter 202(1) without network access or communication with the server 206 or host computer.

In the embodiment shown in FIG. 2, the utility meter 202(1) can include one or more sensors 208(1)-208(N), one or more processors 210, a memory 212, and communication connection(s) 214 or an interface. The sensors 208(1)-208(N) can include a variety of physical characteristic environmental and/or operating sensors, such as temperature, pressure, relative humidity, current flow, voltage, resistance, etc. Each of the sensors 208(1)-208(N) can be in communication with the processor 210, and data output from the sensors 208(1)-208(N) can be received by and stored in memory 212.

In the embodiment shown in FIG. 2, the processor 210 shown can be in communication with the memory 212. The processor 210 can receive outputs from the sensors 208(1)-208(N), and can process or otherwise store the outputs in memory 212. The processor 210 may be implemented as appropriate in hardware, software, firmware, or combinations thereof. Software or firmware implementations of the processor 210 may include computer-executable or machine-executable instructions written in any suitable programming language to perform the various functions described. The memory 212 may store program instructions that are loadable and executable on the processor 210 as well as data generated during the execution of these programs. Depending on the configuration and type of environment or system 200, memory 212 may be volatile (such as random access memory (RAM)) and/or non-volatile (such as read-only memory (ROM), flash memory, etc.). The system 200 may include additional removable storage and/or non-removable storage including, but not limited to, magnetic storage, optical disks, and/or tape storage. The disk drives and their associated computer-readable media may provide non-volatile storage of computer-readable instructions, data structures, program modules, and other data for the computing devices. In some implementations, the memory 212 may include multiple different types of memory, such as static random access memory (SRAM), dynamic random access memory (DRAM), or ROM.

Memory 212, removable storage, and non-removable storage are all examples of computer-readable storage media. For example, computer-readable storage media may include volatile and non-volatile, removable and non-removable media implemented in any method or technology for storage of information such as computer-readable instructions, data structures, program modules, or other data. Memory 212, removable storage, and non-removable storage are all examples of computer storage media. Additional types of computer storage media that may be present include, but are not limited to, programmable random access memory (PRAM), SRAM, DRAM, RAM, ROM, electrically erasable programmable read-only memory (EEPROM), flash memory or other memory technology, compact disc read-only memory (CD-ROM), digital versatile discs (DVD) or other optical storage, magnetic cassettes, magnetic tapes, magnetic disk storage or other magnetic storage devices, or any other medium which can be used to store the desired information and which can accessed by the server or other computing device. Combinations of any of the above should also be included within the scope of computer-readable media.

However, in other embodiments, computer-readable communication media may include computer-readable instructions, program modules, or other data transmitted within a data signal, such as a carrier wave, or other transmission. However, as used herein, computer-readable storage media does not include computer-readable communication media.

Turning to the contents of the memory 210 in more detail, the memory 210 may include an operating system 216 and one or more application programs or services for implementing the features and aspects disclosed herein, including a temperature and/or current receiving module 218, a correlation determination module 220, and a data adjusting module 222. The temperature and/or current receiving module 218 may be configured to receive temperature and/or current sensor information, such as from one or more sensors 208(1)-208(N). In some embodiments, the temperature and/or current receiving module 218 can receive other types of sensor information, such as certain measurable physical characteristics, including, but not limited to, pressure, relative humidity, voltage, resistance, etc. By way of example only, temperature information may include a measured temperature for a particular time or predefined time interval. By way of further example, current information may include a measured current flow for a particular time or predefined time interval. Additionally, the correlation determination module 220 may be configured to determine, based at least in part on a correlation between at least one prior measured temperature and current associated with the first portion or compartment of the utility meter or apparatus, such as 202(1), and a prior measured temperature and current associated with a second portion or compartment of the utility meter or apparatus, such as 202(1), a predicted temperature associated with the second portion or compartment of the utility meter or apparatus, such as 202(1). Moreover, the data adjusting module 222 may be configured to adjust, based at least in part on the predicted temperature associated with the second portion or compartment of the utility meter or apparatus, such as 202(1), a data output associated with the utility meter or apparatus, such as 202(1).

In one embodiment, the correlation determination module 220 can include or otherwise access a look-up table, a graph, a transfer function, or a series of temperatures and currents associated with the first portion of the device and the second portion of the device for different predefined time intervals.

For instance, after receiving at least one temperature measurement associated with at least one portion or compartment of a utility meter, such as 202(1), the correlation determination module 220 can determine a predicted temperature based at least in part on a correlation of previously measured temperatures and currents associated with the first portion of the utility meter and the second portion of the utility meter. In one example, a correlation at t1 between a previously measured temperature of 40° C. at a given current flow of 5 A at a first portion or compartment, and a previously measured temperature of 45° C. at the given current flow of 5 A at a second portion or compartment, can be used by the correlation determination module 220 with a newly measured temperature of 35° C. at a given current flow of 2.5 A at the first portion or compartment to determine a predicted temperature of 40° C. at the given current flow of 2.5 A at the second portion or compartment. One will recognize that any number of temperatures for any number of portions or compartments of a utility meter or apparatus can be measured at any number of current flows for any number of times or predefined time intervals. Based on the collected temperatures, current flows, and time measurements, a correlation can be determined and stored in a look-up table, a graph, a transfer function, or other device. In any instance, based at least in part on the correlation, the correlation determination module 220 can determine a predicted temperature of a different portion or compartment of the utility meter than where a temperature measurement at a given current is measured.

In one embodiment, the data adjusting module 222 can use the predicted temperature associated with the second portion or compartment of the utility meter or apparatus, such as 202(1), to adjust a data output, such as energy consumption data, associated with the utility meter or apparatus, such as 202(1). In this manner, one or more adjustments can be implemented to compensate for a drift in accuracy of the utility meter or apparatus 202(1) due to the temperature change.

The example environment or system 200 may also contain a communication connection or interface 214 that allows one or more of the utility meters 202(1)-202(N) to communicate via the network 204 with the server 206 or host computer, or between utility meters 202(1)-202(N). In some examples, the network 204 may include any one or a combination of multiple different types of networks, such as cable networks, the Internet, wireless networks, cellular networks, and other private and/or public networks. The network 204 may comprise one or more private networks, public networks such as the Internet, or a combination of both configured to transfer data between two or more devices.

The server 206 or host computer may be a computing device, such as a personal computer (PC), a handheld or tablet computer, or other processor-based device. Similar to the utility meters, the server 206 or host computer can include a memory 224, a processor 226, and one or more communication connections 228. These components can be similar to those described above with respect to the utility meters 202(1)-202(N). Further, the memory 224 can include one or more similar modules, such as an operating system 230, a temperature and/or current receiving module 232, a correlation determination module 234, and a data adjusting module 236, which can operate similarly to the modules described above with respect to the utility meters 202(1)-202(N).

Optionally, the server 206 or host computer may include removable storage 238, non-removable storage 240, one or more input device(s) 242, and one or more output device(s) 244. The one or more input devices 242 may include a keyboard, mouse, pen, voice input device, touch input device, etc., and the one or more output devices 244 may include a display, speakers, printer, etc.

While the embodiment shown in FIG. 2 describes a server 206 or host computer with various modules 232, 234, 236, and certain functionality apart from the utility meters 202(1)-202(N), one will recognize that certain functionality associated with the server 206 or host computer can be distributed to any number and combination of servers, processor-based devices, or the utility meters 202(1)-202(N) in accordance with other embodiments of the disclosure.

Various instructions, methods, and techniques described herein may be considered in the general context of computer-executable instructions, such as program modules, executed by one or more computers or other devices. Generally, program modules include routines, programs, objects, components, data structures, etc., for performing particular tasks or implementing particular abstract data types. These program modules and the like may be executed as native code or may be downloaded and executed, such as in a virtual machine or other just-in-time compilation execution environment. Typically, the functionality of the program modules may be combined or distributed as desired in various embodiments. An implementation of these modules and techniques may be stored on some form of computer-readable storage media.

The example utility meter or apparatus 100 and system 200 shown in FIGS. 1A, 1B, and 2 are provided by way of example only. Numerous other apparatus, utility meters, systems, operating environments, system architectures, and device configurations are possible. Accordingly, embodiments of the disclosure should not be construed as being limited to any particular apparatus, utility meter, system, operating environment, system architecture, or device configuration. While the embodiments of the disclosure shown in FIGS. 1A, 1B, and 2 are tailored for an electrical or power utility meter, one will recognize the applicability of other embodiments of the disclosure to other types of utilities, such as water, gas, sewer, data, and other measurable services.

Figure 3:
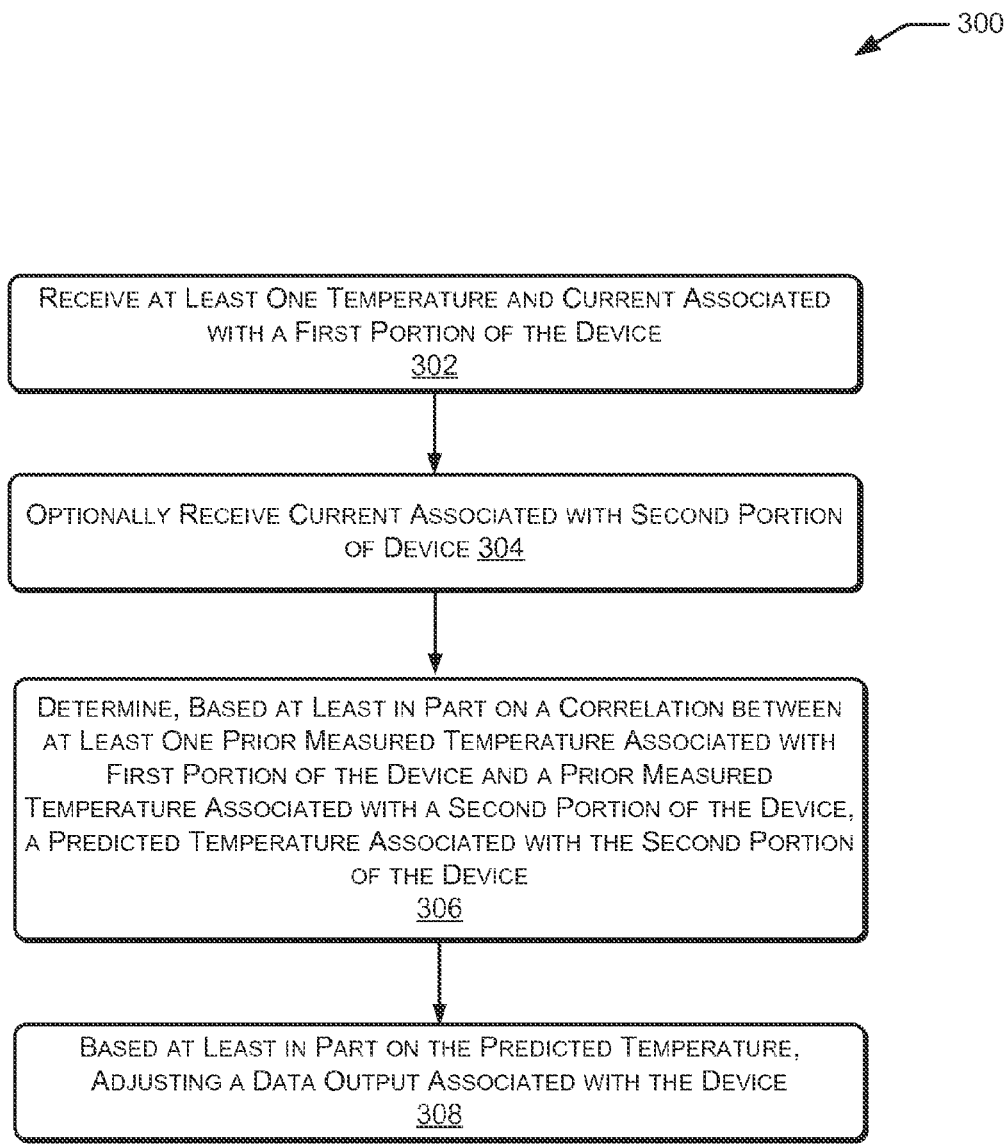
FIG. 3 is a flow diagram of an example method according to an embodiment of the disclosure.

In one example, the illustrative utility meter or apparatus 100, or the example environment and system 200 may perform any, some, or all of the operations of process 300 shown in FIG. 3. This process 300 is illustrated as a logical flow diagram, in which each operation represents a sequence of operations that can be implemented in hardware, software, or a combination thereof. In the context of software, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described operations can be combined in any order and/or in parallel to implement the process.

In this particular implementation, the process 300 may begin at block 302 in which the process 300 may receive at least one temperature and current associated with a first portion of the device. For example, in the embodiment shown in FIG. 2, a processor, such as 210, and/or a temperature and/or current receiving module, such as 218 in FIG. 2, can receive or otherwise measure a temperature via at least one sensor, such as 208(1) in FIG. 2, and a current flow can be received or otherwise measured by another sensor, such as 208(2) in FIG. 2, with both the temperature and current flow being measured at a first portion or compartment of the utility meter or apparatus, such as 202(1) in FIG. 2.

In one embodiment, the at least one sensor is located within a first compartment of the device.

In one embodiment, the device comprises a utility meter or an energy meter.

At block 304, the process 300 can optionally receive a current associated with a second portion of the device. For example, a processor, such as 210 in FIG. 2, and/or the temperature and/or current receiving module, such as 218 in FIG. 2, can optionally receive or otherwise measure a current flow via a sensor, such as 208(N) in FIG. 2, which is at a second portion or compartment of the utility meter or apparatus 202(1) shown.

In one embodiment, the first portion of the device comprises a first compartment of the device, and the second portion of the device comprises a second compartment of the device.

At block 306, the process 300 can determine, based at least in part on a correlation between at least one prior measured temperature associated with the first portion of the device and a prior measured temperature associated with a second portion of the device, a predicted temperature associated with the second portion of the device. For example, a processor, such as 210 in FIG. 2, and/or a correlation determination module, such as 220 in FIG. 2, can determine, based at least in part on a correlation between at least one prior measured temperature associated with the first portion of the utility meter or apparatus 202(1) and a prior measured temperature associated with a second portion of the utility meter or apparatus 202(1) can be used to determine a predicted temperature associated with the second portion of the utility meter or apparatus 202(1).

In one embodiment, the correlation between the at least one prior measured temperature associated with the first portion and at least one prior measured temperature associated with the second portion is measured at different predefined time intervals.

In one embodiment, the correlation includes, but is not limited to, at least one of the following: a look-up table, a graph, a transfer function, or a series of temperatures and currents associated with the first portion of the device and the second portion of the device for different predefined time intervals.

At block 308, the process 300 can, based at least in part on the predicted temperature, adjust a data output associated with the device. For example, the processor, such as 210 in FIG. 2, and/or a data adjusting module, such as 222 of FIG. 2, can receive the predicted temperature of the second portion of the utility meter or apparatus 202(1) to adjust a data output associated with the utility meter or apparatus 202(1).

In one embodiment, the data output can include energy consumption data.

The process 300 may end after block 308. In other process embodiments, fewer or greater numbers of operations can be implemented.

Illustrative systems and methods of temperature compensation in a utility meter are described above. Some or all of these systems and methods may, but need not, be implemented at least partially by an architecture such as those shown in FIGS. 1-3. It should be understood that certain acts in the methods need not be performed in the order described, may be rearranged or modified, and/or may be omitted entirely, depending on the circumstances. Also, any of the acts described above with respect to any method may be implemented by any number of processors or other computing devices based on instructions stored on one or more computer-readable storage media.

Although embodiments have been described in language specific to structural features and/or methodological acts, it is to be understood that the disclosure is not necessarily limited to the specific features or acts described. Rather, the specific features and acts are disclosed as illustrative forms of implementing the embodiments.

The claimed invention is:

1. A system, comprising:
    at least one memory that stores non-transitory computer-executable instructions;
    at least one processor configured to access the at least one memory, wherein the at least one processor is configured to execute the computer-executable instructions to:
        receive, from a sensor of a utility meter, at least one temperature and a current associated with a first portion of the utility meter, wherein a single sensor module receives the temperature and current associated with the first portion of the utility meter;
        determine, based at least in part on a correlation between at least one prior measured temperature and current associated with the first portion of the utility meter and a prior measured temperature and current associated with a second portion of the utility meter, a predicted temperature associated with the second portion of the utility meter; and
        adjust, based at least in part on the predicted temperature associated with the second portion of the utility meter, a data output associated with the utility meter, wherein the data output comprises energy consumption data.

2. The system of claim 1, wherein the first portion of the device comprises a first compartment of the device, and the second portion of the device comprises a second compartment of the device.

3. The system of claim 2, wherein the predicted temperature, from the correlation, associated with the second portion of the device is used to adjust a data output associated with the second portion of the device.

4. The system of claim 1, wherein a temperature sensor is located within the first compartment of the device.

5. The system of claim 1, wherein the device comprises a utility meter or an energy meter.

6. The system of claim 3, wherein the data output comprises energy consumption data.

7. The system of claim 1, wherein the correlation between the at least one prior measured temperature and current associated with the first portion and at least one prior measured temperature and current associated with the second portion is measured at different predefined time intervals.

8. The system of claim 1, wherein the correlation comprises at least one of the following: a look-up table, a graph, a transfer function, or a series of temperatures and currents associated with the first portion of the device and the second portion of the device for different predefined time intervals.

9. A method, comprising:
    receiving, from a sensor of a utility meter, a temperature and a current associated with a first portion of the utility meter;
    determining, based at least in part on a correlation between at least one prior measured temperature and current associated with the first portion of the utility meter and a prior measured temperature and current associated with a second portion of the utility meter, a predicted temperature associated with the second portion of the utility meter; and adjusting, based at least in part on the predicted temperature associated with the second portion of the utility meter, a data output associated with the utility meter, wherein the data output comprises energy consumption data.

10. The method of claim 9, wherein the first portion of the device comprises a first compartment of the device, and the second portion of the device comprises a second compartment of the device.

11. The method of claim 10, wherein the predicted temperature, from the correlation, associated with the second portion of the device is used to adjust a data output associated with the second portion of the device.

12. The method of claim 9, wherein the sensor is located within a first compartment of the device.

13. The method of claim 9, wherein the correlation between the at least one prior measured temperature and current of the first portion and the at least one prior measured temperature and current associated with the second portion of the device is measured at different predefined time intervals.

14. The method of claim 9, wherein the correlation comprises at least one of the following: a look-up table, a graph, a transfer function, or a series of temperatures and currents associated with the first portion of the device and the second portion of the device for different predefined time intervals.

15. One or more non-transitory computer readable media containing computer instructions stored therein for causing a computer processor to perform operations comprising:
receiving, from a sensor of a utility meter, a temperature of a first portion of the utility meter;
receiving, from a sensor of the utility meter, a current associated with the first portion of the utility meter;
determining, based at least in part on a correlation of a prior measured temperature and current associated with the first portion and a prior measured temperature and current associated with a second portion of the utility meter, a predicted temperature associated with the second portion of the utility meter; and
adjusting, based at least in part on the predicted temperature associated with the second portion of the utility meter, a data output associated with the utility meter, wherein the data output comprises energy consumption data.

16. The one or more computer-readable media of claim 15, wherein the first portion comprises a first compartment, and the second portion comprises a second compartment.

17. The one or more computer-readable media of claim 15, wherein the operations further comprise:
based at least in part on the predicted temperature associated with the second portion, adjusting a data output associated with the utility meter.

18. The one or more computer-readable media of claim 15, wherein the correlation comprises at least one of the following: a look-up table, a graph, a transfer function, or a series of temperatures and currents associated with the first portion of the utility meter and the second portion of the utility meter for different predefined time intervals.

* * * * *